US011068793B2

(12) United States Patent
Kitagishi

(10) Patent No.: US 11,068,793 B2
(45) Date of Patent: Jul. 20, 2021

(54) CAUSALITY ANALYSIS DEVICE, METHOD, AND NON-TRANSITORY COMPUTER READABLE STORAGE MEDIUM WITH DETERMINATION OF CAUSAL ADVANTAGES AND DISADVANTAGES TO A USER

(71) Applicant: YAHOO JAPAN CORPORATION, Tokyo (JP)

(72) Inventor: Ikuo Kitagishi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 916 days.

(21) Appl. No.: 15/690,913

(22) Filed: Aug. 30, 2017

(65) Prior Publication Data

US 2018/0082195 A1 Mar. 22, 2018

(30) Foreign Application Priority Data

Sep. 20, 2016 (JP) .............................. JP2016-182897

(51) Int. Cl.
*G06N 5/04* (2006.01)
(52) U.S. Cl.
CPC ..................... *G06N 5/04* (2013.01)
(58) Field of Classification Search
None
See application file for complete search history.

(56) References Cited

U.S. PATENT DOCUMENTS

| 10,380,522 B1* | 8/2019 | Brahms | H04L 67/10 |
| 2012/0058458 A1* | 3/2012 | Reynolds | G09B 7/00 434/353 |
| 2012/0316916 A1* | 12/2012 | Andrews | G06Q 40/08 705/7.28 |
| 2014/0358581 A1* | 12/2014 | Sudharsan | G06N 7/005 705/2 |
| 2015/0248613 A1* | 9/2015 | Harris | G01N 5/04 706/46 |
| 2016/0196105 A1* | 7/2016 | Vartakavi | G06F 3/165 700/94 |
| 2016/0292248 A1* | 10/2016 | Garcia | G06Q 10/067 |

FOREIGN PATENT DOCUMENTS

| JP | H11-250085 A | 9/1999 |
| JP | 2009-059323 A | 3/2009 |
| JP | 2015-230594 A | 12/2015 |

OTHER PUBLICATIONS

Jan. 31, 2017 Office Action issued in Japanese Patent Application No. 2016-182897.

\* cited by examiner

*Primary Examiner* — Alan Chen
(74) *Attorney, Agent, or Firm* — Oliff PLC

(57) ABSTRACT

An inference device disclosed herein includes an identifying unit, and an inferring unit. The identifying unit identifies a set of a predetermined phenomenon, an effect having a causal relation with the predetermined phenomenon, and a polarity of the effect, from concept information in which a phenomenon, an effect having a causal relation with the phenomenon, a polarity to be an indicator of advantages and disadvantages caused by the effect to a user. The inferring unit infers an effect caused when the predetermined phenomenon occurs, and advantages and disadvantages caused by the effect based on the set identified by the identifying unit.

10 Claims, 5 Drawing Sheets

FIG.3

| FIRST LEVEL | SECOND LEVEL | THIRD LEVEL | ... |
|---|---|---|---|
| PUBLIC TRANSPORTATION | TRAIN | ROUTE #1 | ... |
| | | ROUTE #2 | ... |
| | | ... | ... |
| | BUS | OFFICE #1 | ... |
| | | OFFICE #2 | ... |
| | ... | ... | ... |
| ORGANIZATION | OFFICE | ... | ... |
| | ... | ... | ... |
| ... | ... | ... | ... |

FIG.4

| FIRST ELEMENT | SECOND ELEMENT |
|---|---|
| DELAY | SCHEDULED TIME |
| DOES NOT RING | RING |
| GET TOLD OFF | GET PRAISED |
| ... | ... |

| ELEMENT ID | ELEMENT | ATTRIBUTE | POLARITY | STRUCTURE | ... |
|---|---|---|---|---|---|
| 1 | TRAIN | SUBJECT | 0 | 2 | ... |
| 2 | DELAY | EVENT | -3 | 3 | ... |
| 3 | BE LATE | EVENT, EFFECT | -4 | 4,5,6 | ... |
| 4 | GET TOLD OFF | EFFECT | -4 | 3 | ... |
| 5 | OFFICE | SUBJECT | 0 | 3 | ... |
| 6 | DOES NOT RING | EVENT | -3 | 3 | ... |
| ... | ... | ... | ... | ... | ... |

CAUSALITY ANALYSIS DEVICE, METHOD, AND NON-TRANSITORY COMPUTER READABLE STORAGE MEDIUM WITH DETERMINATION OF CAUSAL ADVANTAGES AND DISADVANTAGES TO A USER

CROSS-REFERENCE TO RELATED APPLICATION(S)

The present application claims priority to and incorporates by reference the entire contents of Japanese Patent Application No. 2016-182897 filed in Japan on Sep. 20, 2016.

BACKGROUND OF THE INVENTION

1. Field of the Invention

The present invention relates to an inference device, an inference method, and an inference program.

2. Description of the Related Art

Conventionally, a technique of inference based on conditions formulated in advance and input conditions, such as an expert system, has been known. As one example of such techniques, a technique of inferring a causal relation has been known (Japanese Laid-open Patent Publication No. 2009-059323).

However, inference of advantages and disadvantages caused by a causal relation can be difficult in the conventional technique described above.

For example, it is assumed that advantages and disadvantages caused by a causal relation diversely vary according to a user, a situation of the user, and the like. Therefore, even if inference of one causal relation has been made, it is not easy to infer what kind of advantages and disadvantages to a user are caused by the causal relation.

SUMMARY OF THE INVENTION

It is an object of the present invention to at least partially solve the problems in the conventional technology.

An inference device includes an identifying unit that identifies a set of a predetermined phenomenon, an effect having a causal relation with the predetermined phenomenon, and a polarity of the effect, from concept information in which a phenomenon, an effect having a causal relation with the phenomenon, a polarity to be an indicator of advantages and disadvantages caused by the effect to a user, and an inferring unit that infers an effect caused when the predetermined phenomenon occurs, and advantages and disadvantages caused by the effect based on the set identified by the identifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 shows one example of information registered in a structural information database according to the embodiment;

FIG. 4 shows one example of information registered in an opposite-polarity-pair dictionary database according to the embodiment;

DETAILED DESCRIPTION OF THE PREFERRED EMBODIMENTS

Figure 1:
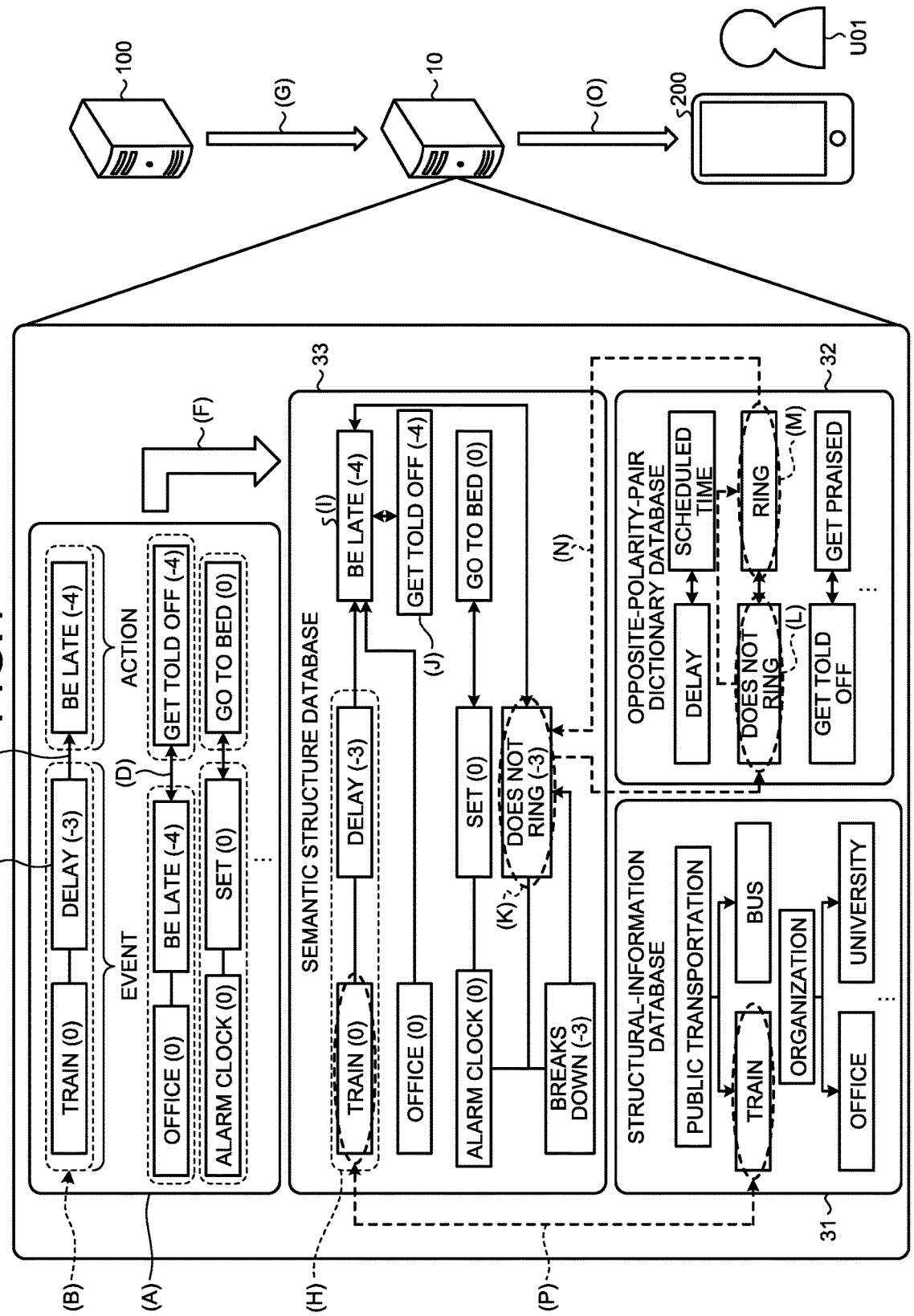
FIG. 1 shows one example of effects exerted by an inference device according to an embodiment.

A form (hereinafter, "embodiment") to implement an inference device, an inference method, and an inference program according to the present application is explained in detail below referring to the drawings. The embodiment is not intended to limit the inference device, the inference method, and the inference program according to the present application. Moreover, like symbols are assigned to like parts throughout following embodiments, and duplicated explanation is omitted.

Furthermore, in the following explanation, one example of inferring an effect caused by a predetermined phenomenon when the predetermined phenomenon occurs, that is, an effect having a causal relation with the predetermined phenomenon, and advantages and disadvantages to a user U01 caused by the effect is described as one example of inference processing that is performed by an inference device 10. However, embodiments are not limited thereto. For example, the inference device 10 can infer, when an arbitrary phenomenon occurs at an arbitrary time, an effect having a causal relation with the phenomenon, and advantages and disadvantages to the user U01 caused by the effect.

1. Concept of Inference Processing

First, a concept of the inference processing that is performed by the inference device 10 is explained using FIG. 1. FIG. 1 shows one example of effects exerted by the inference device according to the embodiment. For example, the inference device 10 is implemented by one or more information processing devices, such as a server device and a cloud system, and is an information processing device that can communicate with a predetermined information distribution server 100 and a terminal device 200 used by the user U01 through a network N (for example, refer to FIG. 2), such as a mobile communication network and a wireless local area network (LAN).

The information distribution server 100 is implemented by one or more information processing devices, such as a server device and a cloud system, and distributes various kinds of information through the network N. For example, the information distribution server 100 can distribute arbitrary information such as train route information and delay information, weather information, financial information of stocks, exchange rates, and the like, and news. In the following explanation, the information distribution server 100 is a server device that distributes the train delay information.

The terminal device 200 is, for example, a mobile terminal such as a smartphone, a tablet, and a personal digital assistant (PDA), or an information processing device such as a personal computer (PC). For example, receiving a result of the inference processing (hereinafter, "inference result") described later from the inference device 10, the terminal device 200 displays the received inference result on a predetermined user interface (UI) to present the contents of the inference result to the user U01.

The inference device 10 performs the inference processing, when a predetermined phenomenon occurs, to infer an effect of the phenomenon, and advantages and disadvantages to be caused to the user U01 by the inferred effect. For example, the inference device 10 stores a semantic structure database in which a phenomenon and possible effects caused by the phenomenon are associated with each other in advance. When one phenomenon occurs, the inference device 10 traces an effect associated with the phenomenon to infer a set of the phenomenon and an effect having a causal relation, and infers advantages and disadvantages to the user U01 caused by the inferred set of phenomenon and effect.

However, it is assumed that sets of a phenomenon and an effect, that is advantages and disadvantages caused by the causal relation can vary diversely according to a user, a situation of the user, and the like. Accordingly, even if a causal relation is inferred, it is not easy to infer what kind of advantages and disadvantages to a user can be caused by the causal relation.

Moreover, in the field of hierarchical learning such as deep learning, a possibility of automatic extraction of features from data without performing formularization of conditions by humans is indicated. However, how models generated by the hierarchical learning learn what kinds of features, that is what kind of condition is formularized is not clear, and in a point that the extracted features are difficult to be explained or understood, there is a limit in flexibility such as manual refinement.

2. Inference Processing Performed by Inference Device According to Embodiment Therefore, the inference device 10 performs inference processing as below. For example, the inference device 10 holds a semantic structure database 33 (that is, "concept information") in which a phenomenon, an effect having a causal relation with the phenomenon, and a polarity to be an indicator of advantages and disadvantages to a user caused by the effect are associated with each other. The inference device 10 identifies a set of a predetermined phenomenon, an effect having a causal relation with the predetermined phenomenon, and a polarity of the effect, from the semantic structure database 33. Subsequently, the inference device 10 infers an effect caused when the predetermined phenomenon occurs, and advantages and disadvantages to a user caused by the effect, based on the identified set.

In the following, one example of a functional configuration and effects of the inference device 10 that implements the inference processing described above is explained using the drawing. In the explanation below, as one example of the inference processing performed by the inference device 10, a state in which an event occurs to a subject is described as "phenomenon", and an effect caused by one phenomenon is described as "effect". Moreover, in the following explanation, "subject", "event", and "effect" are collectively referred to as "element" in some cases.

2-1. One Example of Functional Configuration

Figure 2:
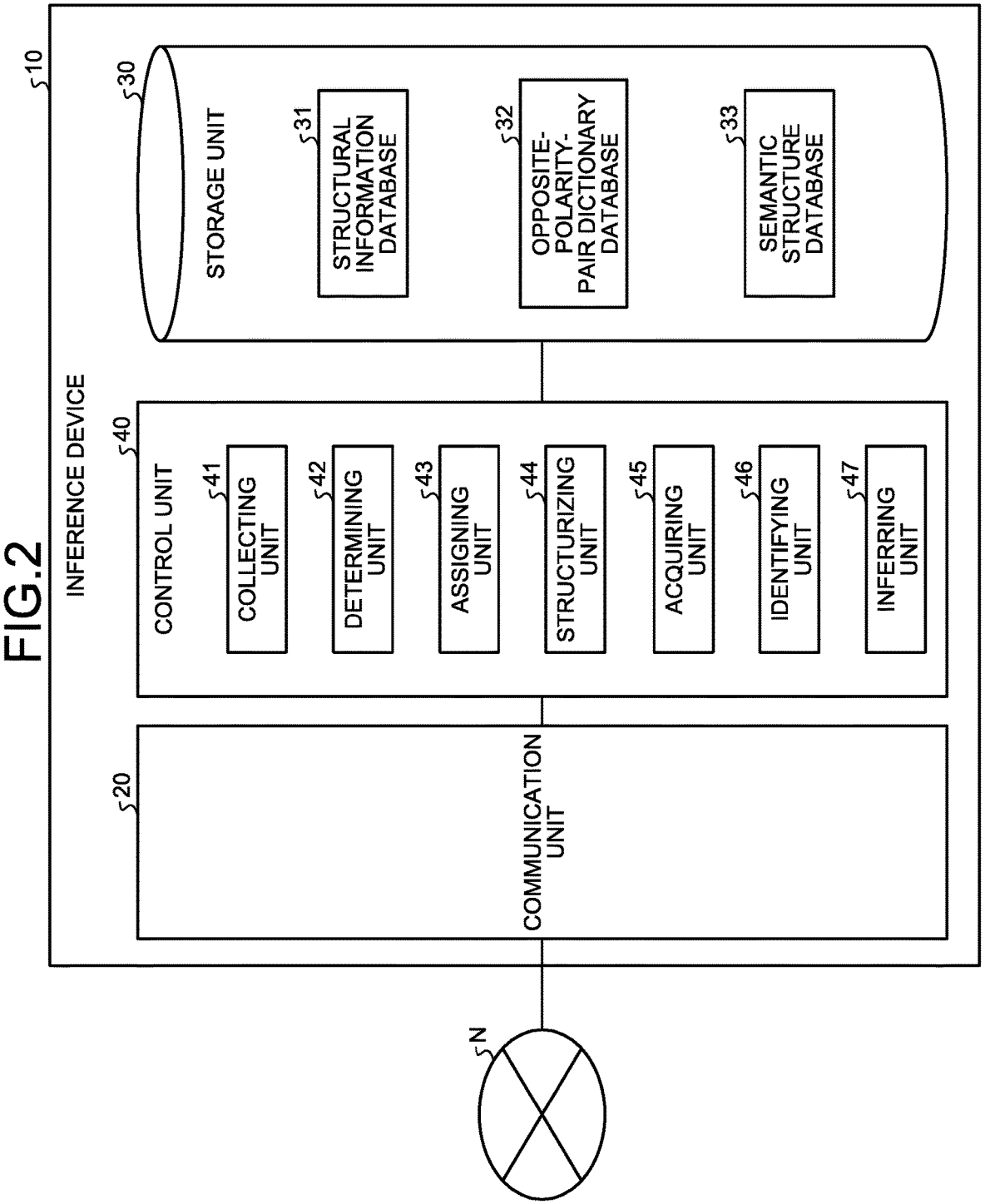
FIG. 2 is a block diagram showing one example of a functional configuration of the inference device according to the embodiment.

FIG. 2 is a block diagram showing one example of the functional configuration of the inference device according to the embodiment. As shown in FIG. 2, the inference device 10 includes a communication unit 20, a storage unit 30, and a control unit 40. The communication unit 20 is implemented, for example, by a network interface card (NIC), or the like. The communication unit 20 is connected to the network N by wired or wireless connection, and communicates inquiries and responses with the terminal device 200.

The storage unit 30 is implemented, for example, by a semiconductor memory device such as a random-access memory (RAM) and a flash memory, or a storage device such as a hard disk and an optical disk. Furthermore, the storage unit 30 includes a structural information database 31, an opposite-polarity-pair dictionary database 32, and a semantic structure database 33. In the following, information registered in the structural information database 31, the opposite-polarity-pair dictionary database 32, and the semantic structure database 33 is explained using FIG. 3 to FIG. 5.

In the structural information database 31, structural information that indicates a conceptual structure among concepts to be a subject of a phenomenon (hereinafter, "subject") is registered. More specifically, in the structural information database 31, thesaurus data in which concepts having a hierarchical structure are systematically complied is registered. For example, in the structural information database 31, a word (it can be a term constituted of one or more words; the same applies hereafter) indicating a subject is registered. For example, FIG. 3 shows one example of information registered in the structural information database according to the embodiment. As shown in FIG. 3, in the structural information database 31, data having items of "first level", "second level", and "third level" is registered.

A word belonging to the "first level" is a word expressing a subject belonging to the highest level of hierarchy among words registered in the structural information database 31, that is the most abstract concept. Moreover, a word belonging to the "second level" is a word expressing a narrower concept of the concept expressed by the associated word belonging to the "first level". Furthermore, a word belonging to the "third level" is a word expressing a narrower concept of the concept expressed by the associated word belonging to the "second level". Although in the example shown in FIG. 3, an example of the "first level" to the "third level" is shown, the thesaurus data having any number of hierarchical levels can be registered in the structural information database 31.

For example, in the example shown in FIG. 3, the first level "public transportation", the second level "train", and the third level "route #1" are registered. Such information indicates that there is a concept expressed by the word "train" as a narrower concept of the concept expressed by the word "public transportation", and there is a concept expressed by the word "route #1" as a narrower concept of the concept expressed by the word "train".

In the opposite-polarity-pair dictionary database 32, information of polarity pair dictionary in which phenomena or effects having paired concepts are associated with each other (that is, "pair information") is registered. For example, in the opposite-polarity-pair dictionary database 32, pair information in which a word expressing a phenomenon or an effect, and a word expressing an opposite concept to that of the phenomenon or the effect are associated with each other is registered.

For example, FIG. 4 shows one example of information registered in the opposite-polarity-pair dictionary database according to the embodiment. As shown in FIG. 4, in the opposite-polarity-pair dictionary database 32, a "first element" and a "second element" are registered in an associated manner. The "first element" and the "second element" are words that express opposite concepts to each other, and are words that express concepts of events of a phenomenon, or concepts of effects.

For example, in the example shown in FIG. 4, in the opposite-polarity-pair dictionary database 32, the first element "delay" and the second element "scheduled time" are associated to be registered. Such information indicates that the first element "delay" and the second element "scheduled time" are words having concepts to be a pair (opposite).

In the semantic structure database 33, concept information in which a phenomenon, an effect having a causal relation with the phenomenon, and a polarity to be an indicator of advantages or disadvantages caused by the effect to a user are associated is registered. More specifically, in the semantic structure database 33, a subject of a phenomenon and an event relating to the subject are associated. Moreover, in the semantic structure database 33, each event and an effect that has a causal relation with the event are associated. Furthermore, in the semantic structure database 33, a polarity indicating an advantage or a disadvantage caused by each effect to a user and the effect are associated to be registered, and a polarity indicating an advantage or a disadvantage caused by each event to a user and the event are associated to be registered.

Figures 5, 6:
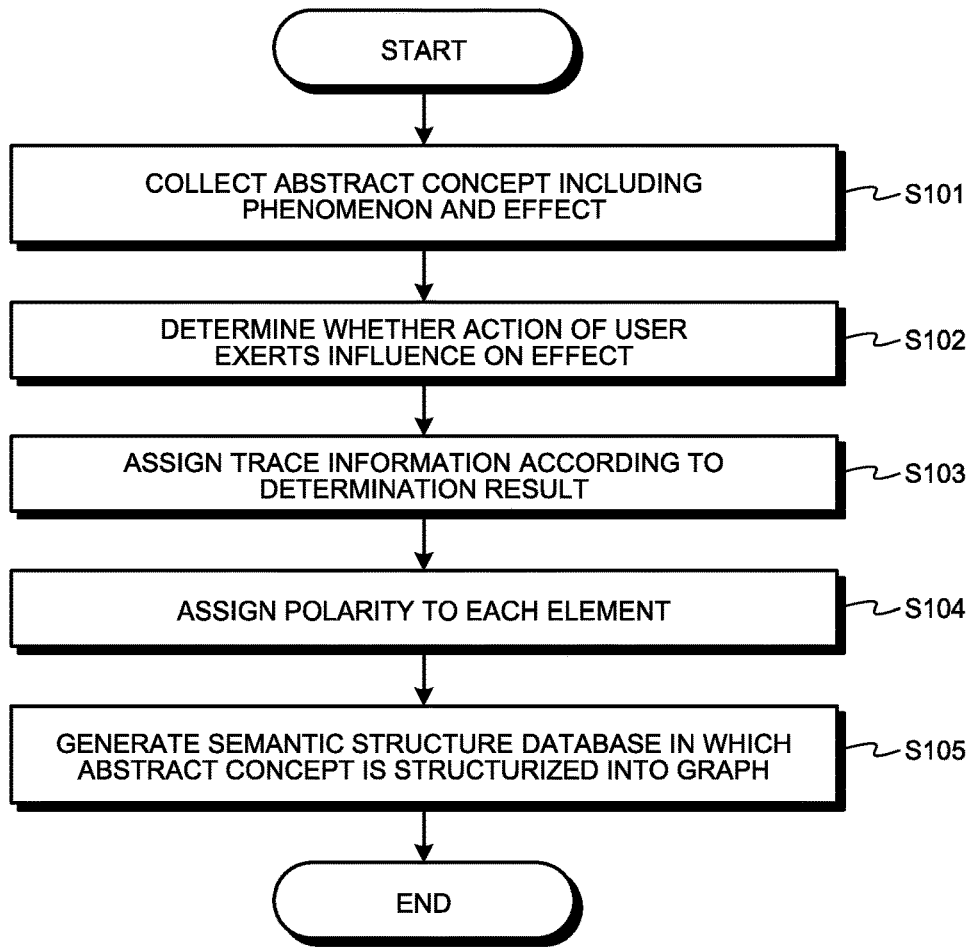
FIG. 5 shows one example of information registered in a semantic structure database according to the embodiment.
FIG. 6 is a flowchart showing one example of a flow of generation processing that is performed by the inference device according to the embodiment.

For example, FIG. 5 shows one example of information registered in the semantic structure database according to the embodiment. In the example shown in FIG. 5, an example in which a conceptual relationship of elements registered in the semantic structure database 33 is implemented by a relational database (RDB) is described.

As shown in FIG. 5, in the semantic structure database 33, data having items of "element identifier (ID)", "element, "attribute", "polarity", and "structure" is registered. The "element ID" is an identifier to identify an element (subject, event, and effect) that is registered in the semantic structure database 33. Moreover, "element" is a word that is registered as an element in the semantic structure database 33. Furthermore, "attribute" is information that indicates which one of a subject, an event, and an effect, an associated element is.

Moreover, "polarity" is a value to be an indicator of an advantage or a disadvantage caused by an associated element to the user U01. For example, as the value of the polarity increases, the associated element expresses a concept that is more likely to cause an advantage to the user U01, and as the value of polarity decreases, the associated element expresses a concept that is more likely to cause a disadvantage to the user U01. Furthermore, when the value of polarity is zero, the associated element expresses a concept that causes neither an advantage nor a disadvantage to the user U01.

Moreover, "structure" is an element ID of another element that has connection with the associated element. That is, "structure" is information that shows, by associating respective elements, a set of a subject and an event relating to the subject, or a causal relation between a phenomenon and an effect.

For example, in the example shown in FIG. 5, the element ID "1", the element "train", the attribute "subject", the polarity "0", and the structure "2" are registered in an associated manner. Such information indicates that the element expressed by the element ID "1" is the element "train", and the attribute thereof is "subject". Moreover, such information indicates that the polarity of the element "train" is "0" and causes no advantage nor disadvantage to the user U01. Furthermore, such information indicates that the element "train" is associated with an element that is expressed by the element ID "2". As described later, the inference device 10 is capable of inferring an effect that has a causal relation with one phenomenon by tracing respective elements registered in the semantic structure database 33 based on a value of the item "structure".

Explanation of FIG. 2 is continued again. The control unit 40 is implemented by executing various kinds of programs that are stored in a storage device inside the inference device 10 by, for example, a central processing unit (CPU), a micro-processing unit (MPU), an application specific integrated circuit (ASIC), or the like, using a storage area of a RAM or the like as a working area. In the example shown in FIG. 2, the control unit 40 includes a collecting unit 41, a determining unit 42, an assigning unit 43, a structurizing unit 44, an acquiring unit 45, an identifying unit 46, and an inferring unit 47 (hereinafter, they can be collectively referred to as respective processing units 41 to 47).

The connection relationship among the respective processing units 41 to 47 included in the control unit 40 is not limited to the connection relationship shown in FIG. 2, but can have other connection relationships. Moreover, the respective processing units 41 to 47 are to implement and perform functions and actions (for example, FIG. 1) of generation processing and inference processing described below, but are of functional units sorted out for explanation, and it is not necessary to match with actual hardware components and software modules. That is, as long as the functions and actions of the generation processing and the inference processing below can be implemented and performed, the inference device 10 can implement and perform the generation processing and the inference processing by arbitrary functional units.

Furthermore, in the following explanation, the generation processing to generate the semantic structure database 33 is performed prior to the inference processing by the respective processing units 41 to 44. Moreover, in the following explanation, the inference processing is performed by the respective processing units 45 to 47 by using the semantic structure database 33 generated by the generation processing.

2-2. One Example of Effects of Generation Processing

The generation processing performed and implemented by the respective processing units 41 to 44 is explained below, using a flowchart shown in FIG. 6. FIG. 6 is a flowchart showing one example of a flow of the generation processing that is performed by the inference device according to the embodiment.

The collecting unit 41 collects abstract concepts including a phenomenon and an effect (step S101). For example, the collecting unit 41 collects a phenomenon (that is, "event") and an effect (that is, "action") having a causal relation with the phenomenon from arbitrary text contents, such as articles of news, a blog, and a microblog on the Internet. More specifically, the collecting unit 41 extracts a set of a word to be a subject and a word expressing an event relating to the subject from arbitrary text contents, as a word set expressing a phenomenon. Furthermore, the collecting unit 41 extracts a word that has a causal relation with the phenomenon expressed by the extracted word set, that is, a word expressing an effect caused as a result of occurrence of the phenomenon, as a word expressing an effect.

For example, the collecting unit 41 analyzes text contents on the Internet by character analysis technique such as morphological analysis. The collecting unit 41 collects a set of three words that express a subject, an event, and an effect, that is, three words expressing a phenomenon constituted of a subject and an event, and an effect caused by the phenomenon. For example, as shown in (A) in FIG. 1, the collecting unit 41 collects a set of a phenomenon constituted of a subject "train" and an event "delay", and an effect "be late" caused as a result of the phenomenon, a set of a phenomenon constituted of a subject "office" and an event "be late", and an effect "get told off" caused as a result of the phenomenon, and a set of a phenomenon constituted of a subject "alarm clock" and an event "set", and an effect "go to bed" occurring as a result of the phenomenon.

Moreover, the determining unit 42 determines whether an action of the user U01 exerts an influence on an effect (step S102). For example, the determining unit 42 analyzes the set of three words collected by the collecting unit 41 expressing a phenomenon and an effect caused when the phenomenon occurs, and determines whether a personal behavior of the use U01 cancel the causal relation between the phenomenon and the effect. For example, as shown in (B) in FIG. 1, the determining unit 42 selects the set of three words, "train, "delay", and "be late" collected by the collecting unit 41, and determines whether the causal relation shown in the selected set of three words can be canceled by a personal effort. In this case, a delay of a train is considered to be a phenomenon that cannot be changed by a personal effort. Therefore, the determining unit 42 determines that the causal relation shown in the set of three words "train", "delay", and "be late" cannot be canceled by a personal effort.

Similarly, the determining unit 42 selects the set of three words, "office", "be late", and "get told off", and determines whether the causal relation shown in the selected set of three words can be canceled by a personal effort. In this case, such an event of being late to an office is considered to be a phenomenon that can be changed by a personal effort. Therefore, the determining unit 42 determines that the causal relation shown in the set of three words "office", "be late", and "get told off" can be canceled by a personal effort.

Moreover, the determining unit selects the set of three words, "alarm clock", "set, and "go to bed", and determines whether the causal relation shown in the selected set of three words can be canceled by a personal effort. In this case, such an event of setting an alarm clock is considered to be a phenomenon that can be manipulated by a personal effort. Therefore, the determining unit 42 determines that the causal relation shown in the set of three words "alarm clock", "set", and "go to bed" can be canceled by a personal effort.

The determining unit 42 is only required to implement the determination described above, for example, based on an arbitrary learning technique, such as deep learning and an associative memory model. For example, the determining unit 42 can determine whether a causal relation shown in a set of three words can be canceled by a personal effort, by using a model that has learned a set of a subject and an event of a phenomenon that can be manipulated by a personal effort, and a set of a subject and an event of a phenomenon that cannot be manipulated by a personal effort in advance.

The assigning unit 43 assigns trace information according to the determination result made by the determining unit 42 (step S103). The trace information is information that indicates whether it is possible to trace back from one effect to a phenomenon or an event that has been a cause of the effect. For example, when the determining unit 42 determines that one causal relation can be canceled by a personal effort, the assigning unit 43 assigns trace information indicating that it is possible to trace back from a word expressing the effect to a word expressing the phenomenon or the event in a set of three words.

Moreover, for example, when the determining unit 42 determines that one causal relation cannot be canceled by a personal effort, the assigning unit 43 assigns trace information indicating that it is impossible to trace back from a word expressing the effect to a word expressing the event or the phenomenon. That is, the assigning unit 43 assigns information indicating whether an element expressing a phenomenon can be arrived by tracing back from an element expressing an effect to words in a set of three words, thereby setting an indicator indicating whether a cause of the causal relation can be canceled.

For example, the determining unit 42 determines that the causal relation shown in the set of three words "train", "delay", and "be late" cannot be canceled by a personal effort. In such a case, as shown in (C) in FIG. 1, the assigning unit 43 sets trace information indicating that it is possible to trace from the element "delay" to the element "be late", but is impossible to trace back from the element "be late" to the element "delay".

Furthermore, for example, the determining unit 42 determines that the causal relation shown in the set of three words "office", "be late", and "get told off" can be canceled by a personal effort. In such a case, as shown in (D) in FIG. 1, the assigning unit 43 sets trace information indicating that it is possible to trace from the element "be late" to the element "get told off", and from the element "get told off" to the element "be late".

The assigning unit 43 assigns trace information indicating whether it is possible to trace elements back from an effect to an event to all of sets of three words that have been determined that the causal relation can be canceled by a personal effort by the determining unit 42. The assigning unit 43 can set information indicating the extent to which the causal relation can be canceled by a personal effort, as the trace information. In this case, the inference device 10 performs processing to tracing back the elements from an effect to an event, assuming that there is a high possibility that cancellation is possible by a personal effect when a value of the trace information is higher than a predetermined threshold.

Subsequently, the assigning unit 43 assigns a polarity to each element (step S104). For example, the assigning unit 43 determines whether respective elements collected by the collecting unit 41 as a set of three words express a concept giving an advantage or a concept giving a disadvantage to the user U01. To an element expressing a concept giving a disadvantage to the user U01, the assigning unit 43 assigns a positive value according to the extent of the advantage as the polarity. On the other hand, to an element expressing a concept giving a disadvantage to the user U01, a negative value according to the extent of the disadvantage as the polarity. The assigning unit 43 sets 0 to the value of the polarity when a concept expressed by an element gives no advantages or disadvantages to the user U01.

For example, as shown in (E) in FIG. 1, the assigning unit 43 determines whether the element "delay" gives a disadvantage to the user U01. Subsequently, for example, when the assigning unit 43 determines that the element "delay" gives a disadvantage to the user U01, the assigning unit 43 assigns "(−3)" thereto as a value of the polarity according to the extent of the disadvantage. Furthermore, when the assigning unit 43 determines that the element "office" gives no advantages nor disadvantages to the user U01, the assigning unit 43 assigns "(0)" to the element "office" as a value of the polarity.

The structurizing unit 44 generates the semantic structure database 33 in which abstract concepts are structurized in graphs (step S105). For example, the structurizing unit 44 registers words collected as a set of three words by the collecting unit 41, as elements expressing a subject, an event, and an effect in the semantic structure database 33. Moreover, the structurizing unit 44 registers values of "structure" among the respective elements such that trace of the elements from the element to be the subject to the element to be the event, and from the element to be the event to the element to be the effect is enabled.

Furthermore, when the trace information indicating that it is possible to trace back from the element to be the effect to the element to be the event is assigned, the structurizing unit 44 registers values of "structure" among the elements such that trace of the elements from the element to be the effect back to the element to be the event is enabled. Moreover, when the trace information indicating that it is impossible to trace from the element to be the effect back to the element to be the event is assigned, the structurizing unit 44 registers values of "structure" among the element such that trace from the element to be the effect back to the element to be the event is disabled.

For example, the structurizing unit 44 registers an element ID of the element "be late" as a value of the item "structure" of the element "delay" in the semantic structure database 33, so that trace from the element "delay" to the element "be late" is possible. On the other hand, the structurizing unit 44 makes sure not to associate an element ID of the element "delay" with the element "be late" as a value of the item "structure" thereof, so that trace from the element "be late" back to the element "delay" is impossible.

Furthermore, for example, the structurizing unit 44 registers an element ID of the element "be late" as a value of the item "structure" of the element "get told off" in the semantic structure database 33 so that trace of the elements from the element "be late" to the element "get told off" is possible, and registers the element ID of the element "be late" as a value of the item "structure" of the element "get told off" in the semantic structure database 33 so that trace of the elements from the element "get told off" to the element "be late" is possible.

Moreover, the structurizing unit 44 sets a value of the polarity assigned to each element by the assigning unit 43. For example, the structurizing unit 44 registers the polarity "−3" associating with the element "delay" in the semantic structure.

The structurizing unit 44 structurizes a semantic structure into a graph by compiling elements expressing an identical concept. For example, it is determined that the word "be late" included in the set of three words "train", "delay", and "be late" and the word "be late" included in the set of three words "office", "be late", and "get told off" are words expressing an identical concept. In such a case, the structurizing unit 44 registers the words "be late" included in the respective sets of three words as one element in the semantic structure database 33.

By such processing, as shown in (F) in FIG. 1, the structurizing unit 44 can generate the semantic structure database 33 that is information that indicates a structure of a concept expressed by each word with a set of three words. More specifically, the structurizing unit 44 can generate concept information in which a phenomenon constituted of a subject and an event, an effect having a causal relation with the phenomenon, and a polarity to be an indicator of advantages and disadvantages caused to a user by the effect are associated with each other. In such the semantic structure database 33, by tracing elements from arbitrary element to another element associated with the element, a phenomenon constituted of a subject and an event related to the subject, an effect having a causal relation with the phenomenon, and the like can be identified.

In the following explanation, it is assumed that the elements are associated with each other in order of the element "train", the element "delay", the element "be late", and then the element "get told off" in the semantic structure database 33. Moreover, in the following explanation, it is assumed that the elements are associated with each other in order of the element "alarm clock", an element "does not ring", the element "be late", and then the element "get told off" in the semantic structure database 33.

2-3. One Example of Effects in Inference Processing

Figure 7:
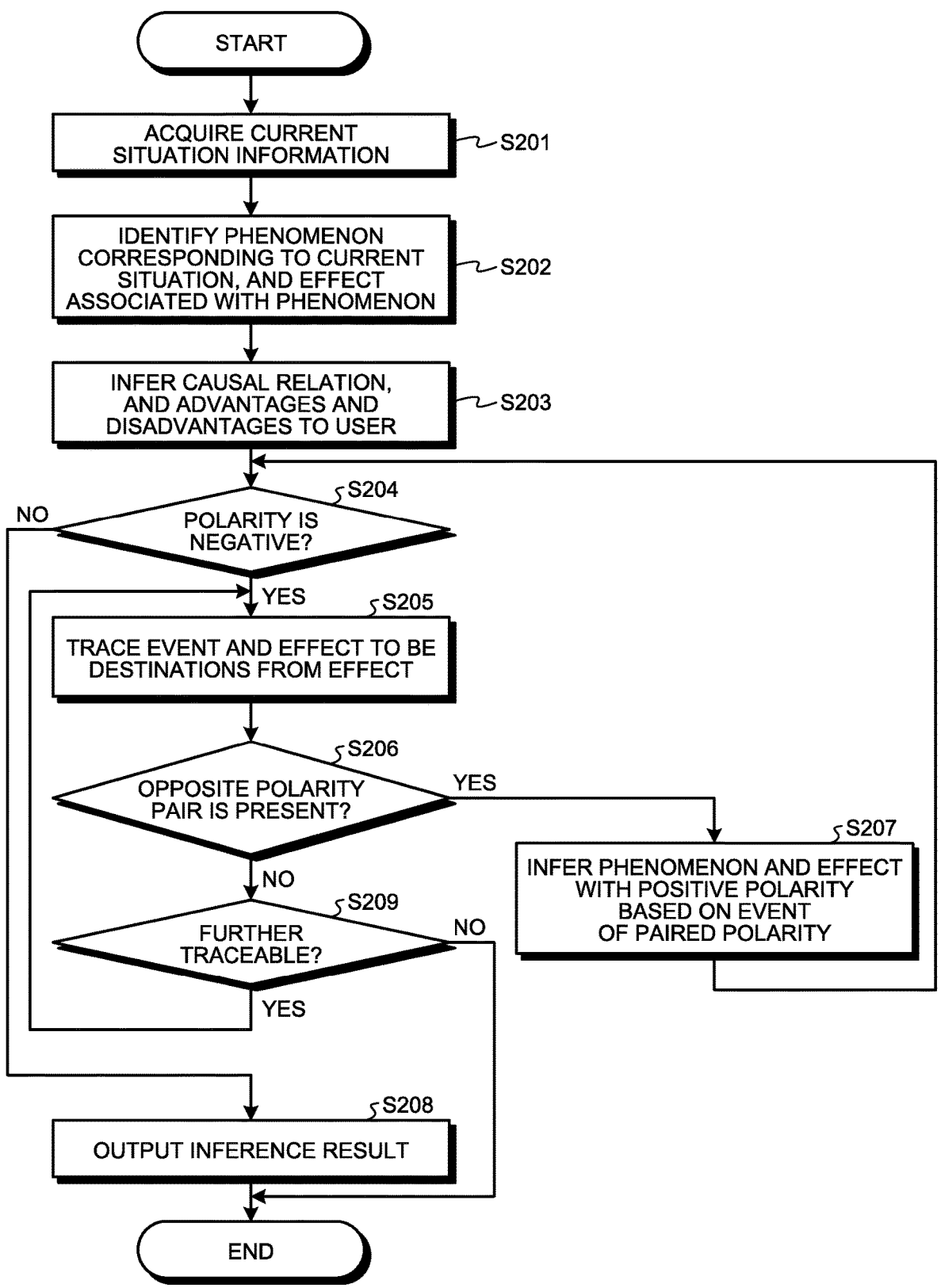
FIG. 7 is a flowchart showing one example of a flow of inference processing that is performed by the inference device according to the embodiment.

Next, details of the inference processing that is implemented by the respective processing units 45 to 47 are explained using a flowchart shown in FIG. 7. FIG. 7 is a flowchart showing one example of a flow of the inference processing that is performed by the inference device according to the embodiment.

The acquiring unit 45 acquires current situation information (step S201). For example, the acquiring unit 45 acquires notification that a train is delayed from the information distribution server 100 as the current situation information as shown in (G) in FIG. 1. In such a case, the acquiring unit 45 transfers the current situation information to the identifying unit 46.

The identifying unit 46 identifies a phenomenon corresponding to the current situation, and an effect associated with the phenomenon (step S202). More specifically, the identifying unit 46 identifies a set of a predetermined phenomenon, an effect having a causal relation with the predetermined phenomenon, and a polarity of the effect, from concept information in which a phenomenon, an effect having a causal relation with the phenomenon, and a polarity to be an indicator of advantages and disadvantages caused by the effect to a user are associated with each other. For example, as the predetermined phenomenon, the identifying unit 46 identifies a phenomenon that is a combination of a predetermined subject and a predetermined event related to the predetermined subject.

For example, when the identifying unit 46 acquires the current situation information indicating a current situation, the identifying unit 46 identifies a set of an element expressing a concept to be a subject of the phenomenon and an element expressing a concept to be an event included in the phenomenon as the predetermined phenomenon. For example, when receiving current situation information indicating that a train is delayed, the identifying unit 46 identifies the element "train" expressing a concept to be the subject, and the element "delay" expressing a concept to be an event in the phenomenon indicated by the current situation information. Furthermore, the identifying unit 46 identifies the set of the element "train" and the element "delay" that are associated with each other by a value of "structure" as a phenomenon from the semantic structure database 33 as shown in (H) in FIG. 1.

Subsequently, the identifying unit 46 identifies an effect having a causal relation with the identified phenomenon by tracing associated elements from the elements identified as the phenomenon, namely, the elements of the subject and the event. For example, the identifying unit 46 identifies the element "be late" that is associated with the identified element "delay" as an effect as shown in (I) in FIG. 1.

Moreover, the identifying unit 46 determines whether the element "be late" is to be not only an "effect" but also an "event", based on the attribute of the identified element "be late". When the element "be late" can also be an "event", The identifying unit 46 traces elements that is associated with the element "be late" and that indicate an effect. As a result, the identifying unit identifies the effect "get told off" that occurs as a result of the event indicated by the element "be late" as shown in (J) in FIG. 1. As a result, the identifying unit 46 can identify a cause (a phenomenon or an event) and an effect in the causal relation that a "delay" of a "train" causes one to "be late", and the causal relation that when one "be late", one "get told off".

Furthermore, the identifying unit 46 identifies a value of polarity "0" assigned to the element "train", a value of polarity "−3" assigned to the element "delay", a value of polarity "−4" assigned to the element "be late", and a value of polarity "−4" assigned to the element "get told off". That is, the identifying unit 46 identifies an event and an effect from the semantic structure database 33, and a polarity to be an indicator of advantages and disadvantages caused by the event to a user and a polarity to be an indicator of advantages and disadvantages caused by the effect to the user besides.

Subsequently, the inferring unit 47 infers a causal relation, and advantages and disadvantages caused to the user based on a result of identification made by the identifying unit 46 (step S203). That is, the inferring unit 47 traces other elements from the identified phenomenon, to infer an effect caused when a predetermined phenomenon occurs, and advantages and disadvantages caused by the effect to the user U01.

For example, based on the set identified by the identifying unit 46, the inferring unit 47 infers an effect caused when a predetermined phenomenon occurs, and advantages and disadvantages caused by the effect to a user based on the values of polarity identified by the identifying unit 46. More specifically, the inferring unit 47 infers advantages and disadvantages to the user based on the polarity of the event and the polarity of the effect identified by the identifying unit 46.

More specific example is explained. For example, the identifying unit 46 identifies the element "train, the element "delay", the element "be late", and the element "get told off". In this case, from the attributes registered in the semantic structure database 33, the inferring unit 47 infers that the subject of a phenomenon is "train", the event of the phenomenon is "delay", and the effects are "be late" and "get told off". Furthermore, from the relationship among the identified subject, event, and effects, the inferring unit 47 infers a phenomenon that "a train is delayed", an effect that one "be late" caused by the phenomenon, and the effect that one "get told off" caused by the effect. Such processing of inferring an event and an effect from an element can be implemented by an associative memory model, or the like.

Moreover, the identifying unit 46 identifies the value of polarity "0" assigned to the element "train, the value of polarity "−3" assigned to the element "delay", the value of polarity "−4" assigned to the element "be late", and the value of polarity "−4" assigned to the element "get told off". In this case, the inferring unit 47 calculates a total value of the respective values of polarity for each set of the set of the phenomenon and the effect, and the set of the event to be the effect and the effect, and infers advantages and disadvantages to the user based on the calculated total value of polarity.

For example, the inferring unit 47 uses "−7" acquired by adding up the value of polarity "0" assigned to the element "train", the value of polarity "−3" assigned to the element "delay", and the value of polarity "−4" assigned to the element "be late" as an indicator of advantages and disadvantages given to the user by the causal relation that "because a train is delayed, one is late". Moreover, for example, the inferring unit 47 uses "−8" acquired by adding up the value of polarity "−4" assigned to the element "be late", and the value of polarity "−4" assigned to the element "get told off" as an indicator of advantages and disadvantages given to the user by the causal relation that "because one is late, one gets told off".

As a result, the inferring unit 47 can infer a causal relation between a phenomenon relating to a user and an effect, or advantages and disadvantages caused by the causal relation to the user easily from the current situation information distributed by the information distribution server 100. For example, the inferring unit 47 can infer the causal relation that "because a train is late, one is late" or the causal relation that "because one is late, one gets told off" from the phenomenon that a "train is late" by tracing elements in the semantic structure database 33. Furthermore, the inferring unit 47 can infer an indicator of advantages and disadvantages caused by an inferred causal relation to a user by using values of polarity that are assigned to an event and an effect. As a result, the inferring unit 10 facilitates inference of a causal relation, and advantages and disadvantages caused by the causal relation to a user.

Explanation is continued. The inferring unit 47 determines whether the total of values of polarity given to the phenomenon and the effect is a negative value (step S204). That is, the inferring unit 47 determines whether the inferred causal relation causes a disadvantage to the user.

When the total of the values of polarities is a negative value (step S204: YES), the identifying unit 46 traces an event and an effect that are connected destinations from the effect (step S205). More specifically, the identifying unit 46 identifies a set of a predetermined phenomenon, an effect having a causal relation with the phenomenon, trace information of the effect, and a polarity of the effect, from the concept information with which the trace information indicating at least one of whether an action of a user exerts an influence on the effect, and the extent of the influence is further associated. For example, the identifying unit 46 refers to a value of structure associated with the element expressing the identified effect, to identify an element indicated by the referred value. When the element identified from the element expressing the effect is an element in the identified causal relation, the identifying unit 46 determines that the identified causal relation can be canceled by a personal effort.

For example, in the case shown in FIG. 1, the identifying unit 46 searches for an element that can be traced from the element "be late". In the case shown in FIG. 1, the element "delay" cannot be traced back from the element "be late". That is, in the case shown in FIG. 1, to the element "be late", the trace information indicating that the causal relation can be canceled by an action of a user is not registered. Therefore, the identifying unit 46 identifies an event or an effect that can cancel the effect indicated by the element "be late" by tracing elements other than the element "delay" from the element "be late". That is, the identifying unit 46 identifies another phenomenon having a causal relation with the effect in the identified causal relation, based on the trace information. It is assumed that in the example shown in FIG. 1, the identifying unit 46 traces from the element "be late" to the element "does not ring".

The inferring unit 47 determines whether an opposite polarity pair is present for the traced event and effect (step S206), and when the opposite polarity pair is present (step S206: YES), the inferring unit 47 infers a phenomenon and an effect having a positive polarity based on an event and an effect in the opposite polarity pair (step S207). On the other hand, when an opposite polarity pair is not present (step S206: NO), it is determined whether elements can be traced further (step S209). When traceable (step S209: YES), step S205 is performed. When not traceable (step S209: NO), the processing is ended.

That is, when the effect identified by the identifying unit 46 causes a disadvantage to a user, the inferring unit 47 infers an effect or an event to reverse the disadvantage caused when the phenomenon identified by the identifying unit 46 occurs, by using the opposite-polarity-pair dictionary database 32 in which events and effects having paired concepts are associated with each other. More specifically, the inferring unit 47 searches the semantic structure database 33 for a phenomenon that is a phenomenon associated with the effect in the set identified by the identifying unit 46, and that is not included in the identified set, and infers a phenomenon in which the event included in the searched phenomenon is replaced with an event having a paired concept by using the opposite-polarity-pair dictionary database 32.

For example, as shown in (K) in FIG. 1, when the identifying unit 46 has traced from the element "be late" to the element "does not ring", the inferring unit 47 determines whether the element "does not ring" is registered in the opposite-polarity-pair dictionary database 32. As shown in (L) in FIG. 1, when the element "does not ring" is registered in the opposite-polarity-pair dictionary database 32, the inferring unit 47 identifies an element that is associated with the element "does not ring", namely, an element "ring" that has a concept opposite to the element "does not ring" as shown in (M) in FIG. 1. Thus, as shown in (N) in FIG. 1, the inferring unit 47 infers a phenomenon enabling to avoid the effect expressed by the element "be late" by replacing the element "does not ring" with the element "ring".

For example, when the data shown in FIG. 1 is registered in the semantic structure database 33, by replacing the element "does not ring" with the element "ring", a phenomenon that an "alarm clock rings" can be inferred from the element "alarm clock" and the element "ring". Therefore, the inferring unit 47 infers an action that enables to avoid the effect of being late, by using the phenomenon of ringing the alarm clock when the phenomenon such as a delay of train occurs. For example, the inferring unit 47 infers a phenomenon of ringing an alarm clock early by generating a variation of phenomenon of ringing an alarm clock. The inferring unit 47 then performs step S204, and determines whether the polarity of the inferred phenomenon or the effect is negative.

Furthermore, when the total value of values of polarity is zero or a negative value (step S204: NO), the inferring unit 47 outputs an inference result (step S208) and ends the processing. For example, the inferring unit 10 infers, from the current situation information that a "train is delayed", not only the causal relations such as that "because a train is delayed, one is late" and that "because one is late, one gets told off", but also an action such as that by ringing an alarm clock early, one can avoid being late". The inferring unit 47 then transmits the inference result to the terminal device 200 used by the user U01 as shown in (O) in FIG. 1.

The inference device 10 can control, for example, the terminal device 200 according to the inference result. For example, when the phenomenon that "ring an alarm clock early" is inferred, the inference device 10 can instruct the terminal device 200 to ring an alarm at a time earlier than a set time by predetermined time.

2-4. Processing Using Structural Information Database

In the above explanation, the processing of inferring advantages and disadvantages caused by a causal relation and the effect to a user by tracing elements registered in the semantic structure database 33, that is, elements that express a subject, a phenomenon, and an effect, and to which polarities are assigned has been explained. Moreover, in the above explanation, the processing of inferring, when the inferred causal relation and effect cause a disadvantage to the user, a phenomenon to avoid the disadvantage by using the opposite-polarity-pair dictionary database 32 in which concepts of opposite polarities are associated with each other has been described.

The inference device 10 can use a thesaurus registered in the structural information database 31 to expand the concept information registered in the semantic structure database 33. Specifically, the inference device 10 can replace a subject in an identified phenomenon with another subject, and infer an effect caused when the subject of the phenomenon is changed, by using structural information that indicates a conceptual structure among subjects.

For example, the inference device 10 searches the structural information database 31 for the element "train" to be a subject as shown in (P) in FIG. 1. Furthermore, the inference device 10 identifies another concept "bus" that belongs to "public transportation" that is a broader concept of "train" to be the subject. The inference device 10 can replace the element "train" with "bus" in the semantic structure database 33 and infer a causal relation that "when a bus is delayed, one is late, and get told off".

For more specific example, when receiving the current situation information indicating that a "train is delayed", the inference device 10 can infer not only the causal relation that "because a train is late, one is late", but also a causal relation that "because a bus is late, one is late". Such a result of the inference processing can be provided to the user U01 as it is, or can be used for control of the terminal device 200, or the like.

3. Modification

The inference device 10 according to the above embodiment can be implemented in various different forms other than the above embodiment. Therefore, in the following, other embodiments of the inference device 10 described above are explained.

3-1. About Inference

For example, the inference device 10 can infer an action of a user also in addition to a phenomenon and an effect. For example, when it is inferred that an identified causal relation causes a disadvantage to a user, the inference device 10 can infer such an action that can cancel the effect included in the causal relation. For example, by registering an event and an effect relating to an action of a user in the semantic structure database 33, the inference device 10 can infer, when any phenomenon causing a disadvantage to a user occurs, an event to avoid the disadvantage, and can infer an action of the user to avoid the disadvantage.

3-2. About Trace Information

The inference device 10 described above is enabled to determine whether traceback from one cause to an event causing the cause by storing the item "structure" that indicates another element that can be traced from one element associating with each element. However, embodiments are not limited thereto. For example, the inference device 10 can store information indicating whether traceback from an effect to an event being the cause is possible.

Moreover, for example, the inference device 10 can store trace information that indicates an extent of a room for change by an action of a person concerned. In such a case, for example, the inference device 10 can infer how much effort should be put by a user to avoid a disadvantage, based on the extent indicated by the trace information. Furthermore, the inference device 10 can prompt an action to avoid a disadvantage to a user.

3-3. About Use of Inference Result

The inference result by the inference device 10 can not only be simply provided to the user U01, but also be used for arbitrary processing. For example, the inference result by the inference device 10 can be used when providing arbitrary service, such as the Internet of Things (IoT), and a personal information manager (PIM), to the user U01. For example, when the inference device 10 infers the causal relation that "because a train is delayed, one is late", and the action that "ring an alarm clock early" to avoid a disadvantage, it can be used for processing of ringing an alarm clock of the user U01, or of turning on a light of the house.

3-4. Other Embodiments

The above embodiments are just examples, and the present embodiments also includes an embodiment exemplified below and others. For example, the functional configuration, the data structures, the order of processing shown in the flowcharts and the processing itself in the present application are just examples, and presence or absence of each element, arrangement thereof, order of processing, details thereof can be changed appropriately. For example, the generation processing and the inference processing described above can be implemented by a device, a method, and a program in a cloud system, other than implementing by the inference device 10 as exemplified in the above embodiments.

Moreover, a configuration to implement the respective processing units 41 to 47 constituting the inference device 10 with respective independent devices is also common. Similarly, the respective units described in the above embodiments can be implemented by calling an external platform and the like by an application program interface (API) or a network computing (so-called, cloud system, and the like). Thus, the configuration of the present embodiments is flexible. Furthermore, the respective components such as the units relating to the present embodiments can be implemented not only by an arithmetic and control unit of a computer, but also by other information processing mechanisms such as a physical electronic circuit.

Moreover, the inference device 10 can be implemented by a frontend server that communicates data with the terminal device 200, and a backend server that performs the generation processing and the inference processing. For example, the backend server performs the generation processing and the inference processing described above all the time. When the backend server infers a causal relation to be disadvantageous to a user, or an event or an action to avoid the disadvantageous effect, the backend server informs the inference result to the frontend server. In such a case, the frontend server controls the terminal device 200 or various kinds of devices relating to the IoT used by the user U01 based on the inference result.

4. Effect

As described above, the inference device 10 identifies a set of a predetermined phenomenon, an effect having a causal relation with the predetermined phenomenon, and a polarity of the effect from the concept information in which a phenomenon, an effect having a causal relation with the phenomenon, and a polarity to be an indicator of advantages and disadvantages caused by the effect to a user are associated with each other. The inference device 10 infers an effect caused when the predetermined phenomenon occurs, and advantages and disadvantages caused by the effect to a user based on the identified set. Therefore, the inference device 10 can infer advantages and disadvantages caused by an effect of a causal relation to a user easily.

Moreover, the inference device 10 identifies a phenomenon that is a combination of a predetermined subject and a predetermined event relating to the predetermined subject, as a predetermined phenomenon. Therefore, the inference device 10 can infer phenomena that are combinations of various subjects and events, and causal relations with effects caused by the phenomena easily.

Furthermore, the inference device 10 identifies a set of a predetermined phenomenon, a polarity of an event included in the phenomenon, an effect having a causal relation with the predetermined phenomenon, and a polarity of the effect, from the concept information in which a polarity to be an indicator of advantages or disadvantages caused by the event to a user is further associated. The inference device 10 then identifies advantages and disadvantages to the user based on the polarity of the event and the polarity of the effect included in the identified set. Therefore, the inference device 10 can infer advantages and disadvantages caused by one phenomenon or advantages and disadvantages caused by one effect to a user easily.

Moreover, the inference device 10 uses the opposite-polarity-pair dictionary database 32 in which events or effects having paired concepts are associated with each other when a result inferred based on the identified set gives a disadvantage to the user, to infer an effect or an event to inverse the disadvantage that is caused when the predetermined phenomenon occurs. For example, the inference device 10 searches for a phenomenon that is a phenomenon corresponding to the effect included in the identified set, and not included in the identified set from the concept information, and infers a phenomenon in which the event is replaced with an event having a concept paired with the event included in the searched phenomenon by using the opposite-polarity-pair dictionary database 32. Therefore, for example, when an event or effect cause a disadvantage to a user occurs, the inference device 10 can infer a phenomenon to avoid or to ease the event or the effect.

Furthermore, the inference device 10 changes the subject of the identified phenomenon to another subject by using the structural information database 31 that indicates conceptual structures among subjects, and infers the effect when the subject of the phenomenon is changed. Therefore, the inference device 10 can infer various causal relations, expanding the concept information registered in the semantic structure database 33.

Moreover, the inference device 10 infers another phenomenon having a causal relation with an identified effect based on the trace information that indicates at least one of whether an action of a user exerts an influence on the effect, and the extent of the influence. Therefore, the inference device 10 can infer an action of a user to avoid a disadvantageous event or effect.

The above-described "unit (section, module, unit)" can be replaced with "means", "circuit", or the like. For example, the inferring unit can be referred to as inferring means or inferring circuit.

According to one aspect of the embodiment, inference of advantages and disadvantages to a user caused by a causal relation can be facilitated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inference device comprising:
   a processor programmed to function as:
      an identifying unit that identifies a set of a predetermined phenomenon, an effect having a causal relation with the predetermined phenomenon, and a polarity of the effect, from concept information in which a phenomenon, an effect having a causal relation with the phenomenon, a polarity to be an indicator of advantages and disadvantages caused by the effect to a user are associated with each other, the identifying unit determining whether or not the causal relation is capable of being canceled by a personal effort of a user;
      an assigning unit,
         wherein when the identifying unit determines the causal relation is capable of being canceled by the personal effort of the user, the assigning unit assigns trace information indicating that it is possible to trace back from a word expressing the effect to a word expressing the phenomenon, and
         wherein when the identifying unit determines the causal relation is not capable of being canceled by the personal effort of the user, the assigning unit assigns trace information indicating that it is impossible to trace back from the word expressing the effect to the word expressing the phenomenon; and
      an inferring unit that infers an effect caused when the predetermined phenomenon occurs, and advantages and disadvantages caused by the effect based on the set identified by the identifying unit.

2. The inference device according to claim 1, wherein the identifying unit identifies a phenomenon that is a combination of a predetermined subject and a predetermined event relating to the predetermined subject, as the predetermined phenomenon.

3. The inference device according to claim 2, wherein the identifying unit identifies a set of the predetermined phenomenon, a polarity of an event included in the phenomenon, an effect having a causal relation with the predetermined phenomenon, and a polarity of the effect, from concept information in which a polarity to be an indicator of advantages and disadvantages caused by the event to a user is further associated, and the inferring unit infers advantages and disadvantages to the user based on the polarity of the event and the polarity of the effect included in the set identified by the identifying unit.

4. The inference device according to claim 2, wherein the inferring unit infers, when the effect inferred based on the set identified by the identifying unit causes a disadvantage to the user, any one of an effect and an event to inverse the disadvantage caused when the predetermined phenomenon occurs, by using pair information in which any one of events and effects having paired concepts are associated with each other.

5. The inference device according to claim 4, wherein the inferring unit searches for a phenomenon that is a phenomenon corresponding to an effect included in the set identified by the identifying unit and that is not included in the set identified by the identifying unit from the concept information, and infers a phenomenon in which an event included in the searched phenomenon is replaced with an event having a concept paired with that of the event in the searched phenomenon by using the pair information.

6. The inference device according to claim 2, wherein the inferring unit changes the subject of the phenomenon identified by the identifying unit to another subject, and infers an effect when the subject of the phenomenon is changed, by using structural information that indicates conceptual structures among the subjects.

7. The inference device according to claim 1, wherein the identifying unit identifies another phenomenon having a causal relation with the identified effect, based on trace information that indicates at least one of whether an action of the user exerts an influence on the effect, and an extent of the influence.

8. An inference method that is performed by an inference device, the method comprising:
   identifying a set of a predetermined phenomenon, an effect having a causal relation with the predetermined phenomenon, and a polarity of the effect, from concept information in which a phenomenon, an effect having a causal relation with the phenomenon, a polarity to be an indicator of advantages and disadvantages caused by the effect to a user are associated with each other, the identifying including determining whether or not the causal relation is capable of being canceled by a personal effort of a user;
   assigning trace information, wherein when the identifying determines the causal relation is capable of being canceled by the personal effort of the user, the assigning the trace information includes indicating that it is possible to trace back from a word expressing the effect to a word expressing the phenomenon, and wherein when the identifying determines the causal relation is not capable of being canceled by the personal effort of the user, the assigning the trace information includes indicating that it is impossible to trace back from the word expressing the effect to the word expressing the phenomenon; and inferring an effect caused when the predetermined phenomenon occurs, and advantages and disadvantages caused by the effect based on the set identified at the identifying.

9. A non-transitory computer readable storage medium having stored therein an inference program causing a computer to execute a process comprising:

identifying a set of a predetermined phenomenon, an effect having a causal relation with the predetermined phenomenon, and a polarity of the effect, from concept information in which a phenomenon, an effect having a causal relation with the phenomenon, a polarity to be an indicator of advantages and disadvantages caused by the effect to a user are associated with each other, the identifying including determining whether the causal relation is capable of being canceled by a personal effort of a user;

assigning trace information, wherein when the identifying determines the causal relation is capable of being canceled by the personal effort of the user, the assigning the trace information includes indicating that it is possible to trace back from a word expressing the effect to a word expressing the phenomenon, and wherein when the identifying determines the causal relation is not capable of being canceled by the personal effort of the user, the assigning the trace information includes indicating that it is impossible to trace back from the word expressing the effect to the word expressing the phenomenon; and inferring an effect caused when the predetermined phenomenon occurs, and advantages and disadvantages caused by the effect based on the set identified at the identifying.

10. The inference device according to claim 1, wherein the identifying unit identifies a phenomenon that is a combination of a predetermined subject textual phrase and a predetermined event relating to the predetermined subject textual phrase, as the predetermined phenomenon.

* * * * *